July 3, 1962 R. A. BUB 3,042,213
FILTER GASKET
Filed Aug. 14, 1959 2 Sheets-Sheet 1

INVENTOR.
ROBERT A. BUB
BY
His ATTORNEYS

INVENTOR
ROBERT A. BuB
BY Brown, Critchlow, Flick & Peckham
HIS ATTORNEYS

United States Patent Office 3,042,213
Patented July 3, 1962

3,042,213
FILTER GASKET
Robert A. Bub, Penn Hills, Pa., assignor to Mine Safety Appliances Company, Pittsburgh, Pa., a corporation of Pennsylvania
Filed Aug. 14, 1959, Ser. No. 833,858
1 Claim. (Cl. 210—323)

This invention relates to gaskets for insertion between the frames of filters arranged in a group, to prevent leakage between the frames.

When rectangular filters are arranged in parallel rows, it is difficult to prevent leakage of fluid between the filter frames, no matter how tightly they may be clamped together. Leakage occurs principally where the corners of adjoining frames meet, because the outside of each frame corner always has at least a small radius and therefore passages are formed between the frames at the corners.

It is among the objects of this invention to provide a gasket and a gasket network for sealing any spaces that might otherwise occur between rectangular filters clamped together in a group.

In accordance with this invention, each gasket comprises a cross formed from two straight compressible strips that intersect each other at their centers. The two strips may be integrally joined, or each may have a transverse slot at its center extending half way across the strip and receiving the unslotted half of the other strip. The gasket cross is clamped between four rectangular filter frames that are arranged in a square, whereby the strips extend between adjoining pairs of the frames and also fill the space where the corners of the frames come together. Two ends of the strips have integral tongues and the other two ends are provided with notches substantially the same size and shape as the tongues. Since each gasket is made large enough to extend half way across the adjoining filter frames, adjoining gasket crosses can be connected together by fitting their tongues and notches together to provide a gasket network between all of the filter frames.

The invention is illustrated in the accompanying drawings, in which

Figure 1:
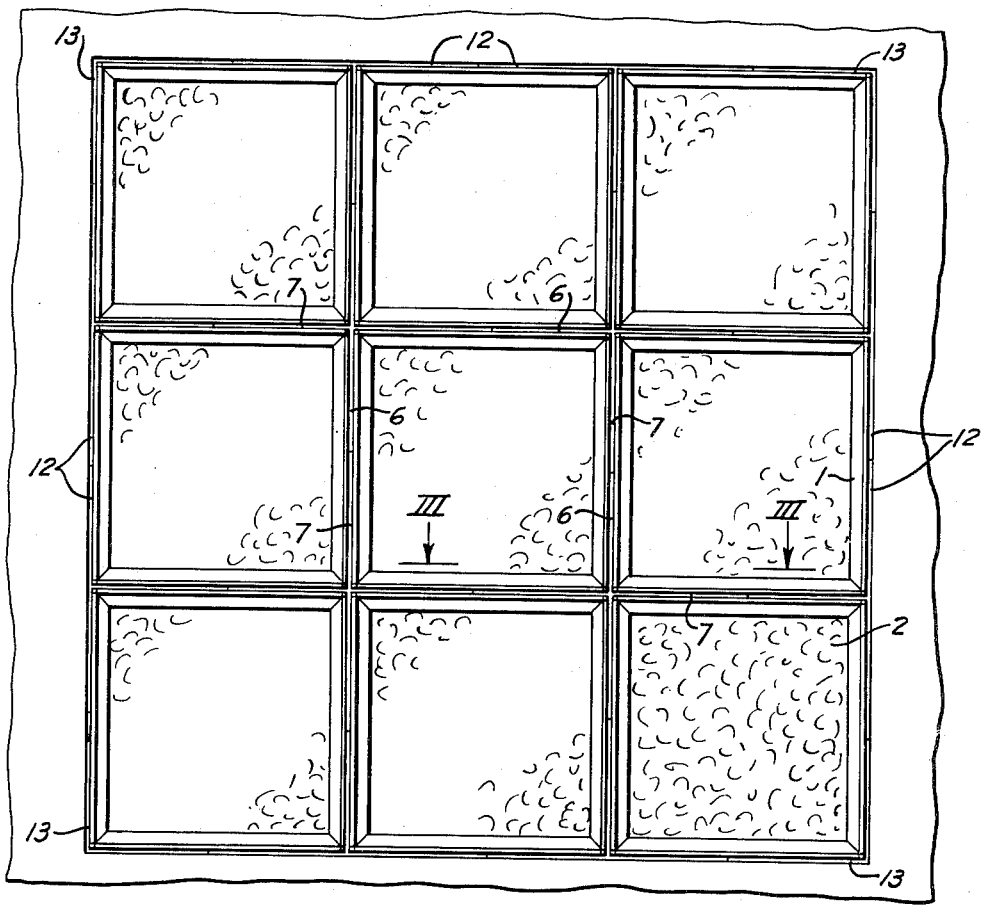
FIG. 1 is a face view of a bank of filters separated by my gaskets.
Figure 2:
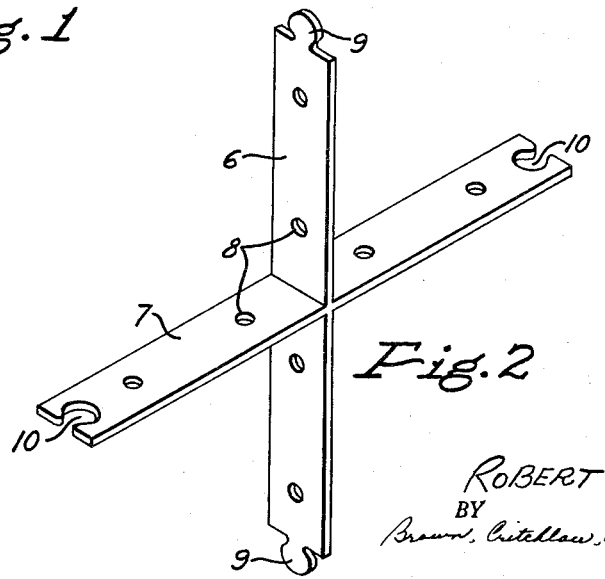
FIG. 2 is an enlarged perspective view of a gasket cross.
Figure 3:
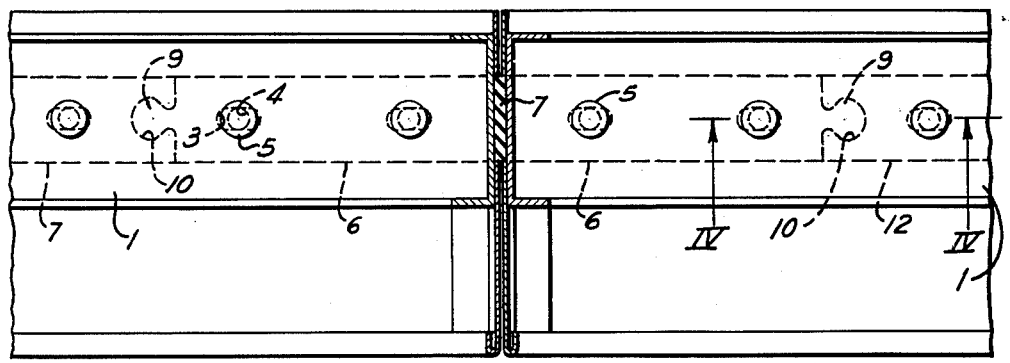
FIG. 3 is an enlarged fragmentary section taken on the line III—III of FIG. 1, with the filter elements removed.
Figure 4:
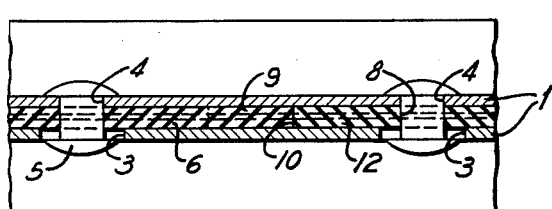
FIG. 4 is a further enlarged section taken on the line IV—IV of FIG. 3.

Referring to FIG. 1 of the drawings, a bank of filters is formed from individual rectangular filters arranged in parallel rows. Each filter includes a rectangular frame 1, in which there is a filter element 2 of any desired construction. As shown in FIGS. 3 and 4, the sides of the frames are provided with slots 3 and round holes 4 that receive suitable fastening members, such as rivets 5, for clamping the various frames together. Fluid is prevented from bypassing the filters through openings between their frames, particularly at their corners, by means of a network of gaskets clamped between the frames. Each gasket is in the form of a cross produced by connecting two intersecting strips 6 and 7 together at their centers. The strips are made of a suitable compressible gasket material, such as rubber or the like, and each cross may be molded in one piece so that the two strips are integral with each other as shown in FIG. 2. The cross is inserted between the frames of four filters arranged in a square, the strips or arms of the cross extending outward between the frames from the point where the corners of the frame come together.

Each gasket cross is provided with holes 8, through which clamping rivets 4 extend so that the cross is held in correct position between the filter frames when they are connected together. In order to make the seal continuous between all of the filter frames, each gasket strip extends about half way across the adjoining filter frames, and the ends of the strips are provided with tongues and tongue-receiving notches. To avoid having to use two different types of crosses, one with only tongues and one with only notches, each cross has two tongues 9 and two notches 10. The crosses may be arranged with a tongue and notch at opposite ends of each strip, or with the tongues at the opposite ends of one strip and notches at the opposite end of the other strip in the same cross, as shown. The tongues on a gasket cross will fit snugly into the notches in two adjoining crosses, and the notches in the first cross will snugly receive tongues on two other crosses. The result is a network of gasket strips extending at right angles to each other continuously between all of the filters in the group. The tongues have narrow inner ends and the notches are shaped in a corresponding manner so that interconnected strips cannot pull apart.

The outer filters in the group can have their outer sides sealed by gaskets 12 formed by removing one arm of each cross to convert it into a T, as shown in FIG. 1. The stem of the T will extend between two filters and be connected to the cross that also projects between those filters. At the corners of the bank of filters, half of each strip of a cross is removed to leave a right angular gasket 13 that will extend around the outer corner of a filter frame and connect with the arms of the T-shaped gaskets 12 also extending along the outer surfaces of the frames.

Figure 5:
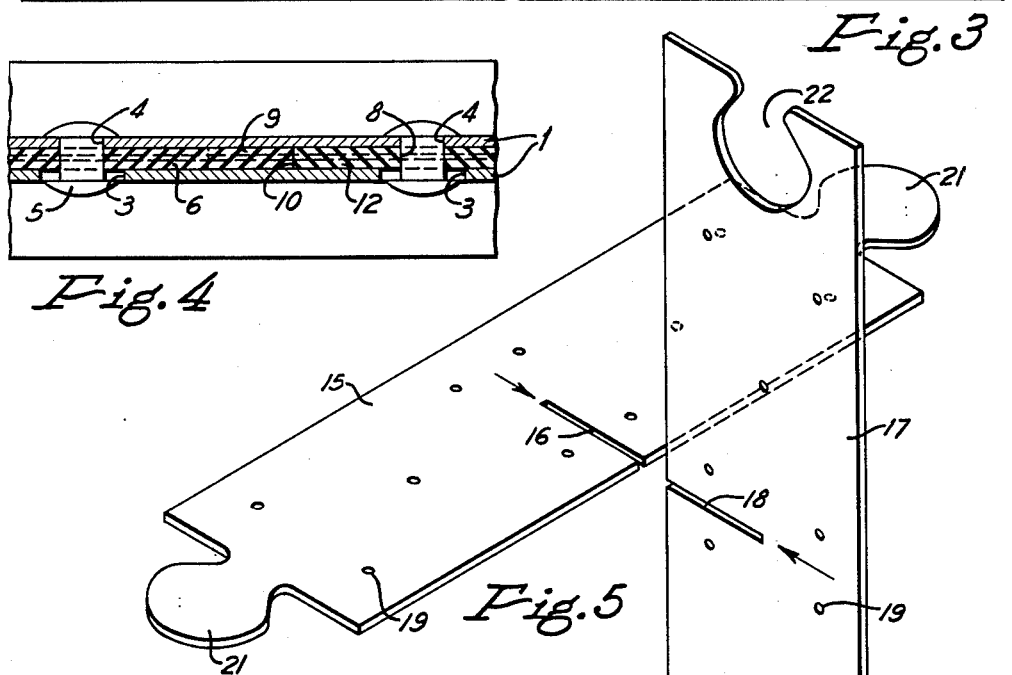
FIG. 5 is an exploded perspective view of a modified gasket cross.
Figure 6:
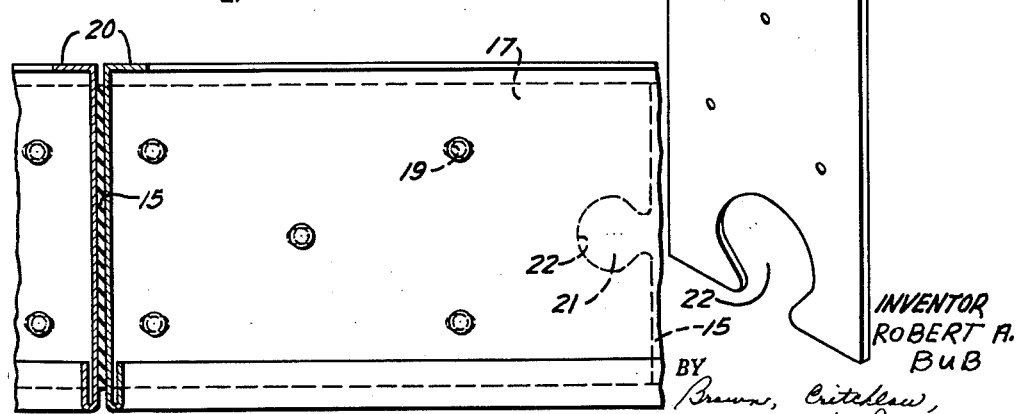
FIG. 6 is a fragmentary section, similar to FIG. 3, showing the modified gasket in place.

Instead of using a unitary gasket cross like the one shown in FIG. 2, a cross that will serve the same purpose can be formed from separate gasket strips that are interlocked at their centers. Thus, as shown in FIG. 5, one strip 15 is provided with a central slot 16 extending half way across it, and another strip 17 has a corresponding slot 18 extending half way across its center. When the two strips are arranged as shown and then pushed together, each slot will receive the solid portion of the other strip at the inner end of the slot in that strip, so the two strips will cross each other at their centers. The strips are provided with holes 19 for receiving fastening members (not shown) by which the cross is clamped between four rectangular filter frames in the manner described previously herein. The particular gasket strips shown in FIG. 5 are designed for a different type of frame than the ones shown in FIG. 3, the modified frames 20 being indicated in FIG. 6. The strips are provided with tongues 21 and notches 22 at their ends so that adjoining crosses can be connected together to form a continuous network.

According to the provisions of the patent statutes, I have explained the principle of my invention and have illustrated and described what I now consider to represent its best embodiment. However, I desire to have it understood that, within the scope of the appended claim, the invention may be practiced otherwise than as specifically illustrated and described.

I claim:

A filter unit comprising a plurality of rectangular filter frames of uniform size arranged side by side in parallel rows to form a bank of frames, a filter in each frame, sealing means surrounding said bank of frames in engagement therewith, a plurality of compressible sealing strips at right angles to each other between said frames and joined together in pairs forming crosses having arms, the center of each cross being located at the corner intersection of four of said frames, the ends of said strips being provided with tongues and notches connecting the crosses together, said surrounding sealing means having compressible arms extending inward between the frames and connected with the ends of the adjoining cross arms, and fastening members extending through the opposed sides of said frames and said arms between them and clamping the arms tightly between the frames to seal the spaces between the frames.

References Cited in the file of this patent

UNITED STATES PATENTS

| | | |
|---|---|---|
| 281,760 | Gingras | July 24, 1883 |
| 1,598,097 | Mathis | Aug. 31, 1926 |
| 1,747,364 | Green | Feb. 18, 1930 |
| 1,898,424 | Collins | Feb. 21, 1933 |
| 1,986,465 | Dempsey | Jan. 1, 1935 |
| 2,031,684 | Berger | Feb. 25, 1936 |
| 2,108,283 | Drew et al. | Feb. 15, 1938 |
| 2,792,906 | Evans | May 21, 1957 |
| 2,869,356 | Kulhavy | Jan. 20, 1959 |